US011731264B2

United States Patent
Shih

(10) Patent No.: US 11,731,264 B2
(45) Date of Patent: Aug. 22, 2023

(54) MOBILE VEHICLE HAVING AN AOI DYNAMIC INSPECTION SYSTEM WITH MULTI-ANGLE VISUAL QUALITY

(71) Applicant: IMMENSE DIGITIZE ENGINEERING CO., LTD., Taichung (TW)

(72) Inventor: Chung-Jen Shih, Taichung (TW)

(73) Assignee: IMMENSE DIGITIZE ENGINEERING CO., LTD., Taichung (TW)

( * ) Notice: Subject to any disclaimer, the term of this patent is extended or adjusted under 35 U.S.C. 154(b) by 246 days.

(21) Appl. No.: 17/340,390

(22) Filed: Jun. 7, 2021

(65) Prior Publication Data

US 2022/0388151 A1    Dec. 8, 2022

(51) Int. Cl.
*B25J 9/00* (2006.01)
*B25J 5/00* (2006.01)
*B25J 13/08* (2006.01)
*B25J 19/02* (2006.01)
*B25J 9/16* (2006.01)

(52) U.S. Cl.
CPC ............. *B25J 9/0009* (2013.01); *B25J 5/007* (2013.01); *B25J 13/089* (2013.01); *B25J 19/023* (2013.01); *B25J 19/027* (2013.01)

(58) Field of Classification Search
CPC ........ B25J 9/0009; B25J 5/007; B25J 13/089; B25J 19/023; B25J 19/027; B25J 9/1697; B25J 5/00; B25J 9/16; B25J 13/00; G06T 7/00
See application file for complete search history.

(56) References Cited

U.S. PATENT DOCUMENTS

| 2018/0267690 | A1* | 9/2018  | Kemp    | B25J 5/007  |
|--------------|-----|---------|---------|-------------|
| 2021/0101288 | A1* | 4/2021  | Lee     | A61G 7/05   |
| 2021/0237263 | A1* | 8/2021  | Kojima  | B60R 16/033 |
| 2021/0331542 | A1* | 10/2021 | Ye      | B60G 3/14   |
| 2021/0354966 | A1* | 11/2021 | Kong    | B66F 9/12   |
| 2022/0272900 | A1* | 9/2022  | Hiraoka | B25J 19/023 |
| 2022/0305663 | A1* | 9/2022  | Turpin  | B25J 19/023 |

FOREIGN PATENT DOCUMENTS

DE    102017211057 A1 *  1/2019

* cited by examiner

*Primary Examiner* — Adam R Mott
*Assistant Examiner* — Heather J Keniry
(74) *Attorney, Agent, or Firm* — Muncy, Geissler, Olds & Lowe, P.C.

(57) ABSTRACT

A mobile vehicle having an Automated Optical Inspection (AOI) dynamic inspection system with multi-angle visual quality includes a base body, two driving brackets, two connecting rod assemblies and an arm member and a working portion. The arm member is swingably disposed on the base body. The working portion is disposed on one end of the arm member which is remote from the base body. The working portion includes a first photographing device. The first photographing device is configured for capturing an image of an object. At least two second photographing devices are configured to be disposed in an environment and configured for capturing an image of the object.

15 Claims, 9 Drawing Sheets

MOBILE VEHICLE HAVING AN AOI DYNAMIC INSPECTION SYSTEM WITH MULTI-ANGLE VISUAL QUALITY

BACKGROUND OF THE INVENTION

Field of the Invention

The present invention relates to a mobile vehicle having an Automated Optical Inspection AOI) dynamic inspection system with multi-angle visual quality.

Description of the Prior Art

Generally, products have to be inspected and checked in size after produced so as to eliminate defective products, and post-processing steps, such as spraying of coating, are often performed on the products. Conventionally, inspection and checking steps are carried out manually, which will not only result in a lot of labor costs but also inaccurate detection due to human negligence during manual measurement, so the production process is inefficient and disadvantageous to product quality.

The present invention is, therefore, arisen to obviate or at least mitigate the above-mentioned disadvantages.

SUMMARY OF THE INVENTION

The main object of the present invention is to provide a mobile vehicle having an AOI dynamic inspection system with multi-angle visual quality which can move stably and can quickly and efficiently inspect, detect and measure an object.

To achieve the above and other objects, a mobile vehicle having an AOI dynamic inspection system with multi-angle visual quality is provided, including: a base body; two driving racks, connected to the base body, each of the two driving racks including a first rod member, a first wheel, a driving device and a driving wheel, the first rod member being connected to the base body, the driving wheel being connected to a driving shaft of the driving device, the first wheel being connected to an end of the first rod member remote from the driving device; two connecting rod assemblies, connected to the base body, each of the two connecting rod assemblies including a second rod member and a second wheel, the second rod member being connected to the base body, the second wheel being connected to an end of the second rod member, two side plates being disposed to another end of the second rod member, the two side plates each including an elongate slot, the first rod member being disposed between the two side plates, a fastener being disposed through the elongate slots of the two side plates and the first rod member so that the two side plates are movable relative to the first rod member; an arm member, swingably connected to the base body; a working portion, disposed to an end of the arm member remote from the base body, including a first photographing device, the first photographing device being configured for capturing an image of the object; at least two second photographing devices, configured to be disposed in an environment and configured for capturing an image of the object; wherein the arm member is driven to move according to the relative spatial relationship of the working portion and the object obtained by automated optical inspection (AOI) according to the images of the object captured by the first photographing device and the at least two second photographing devices.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
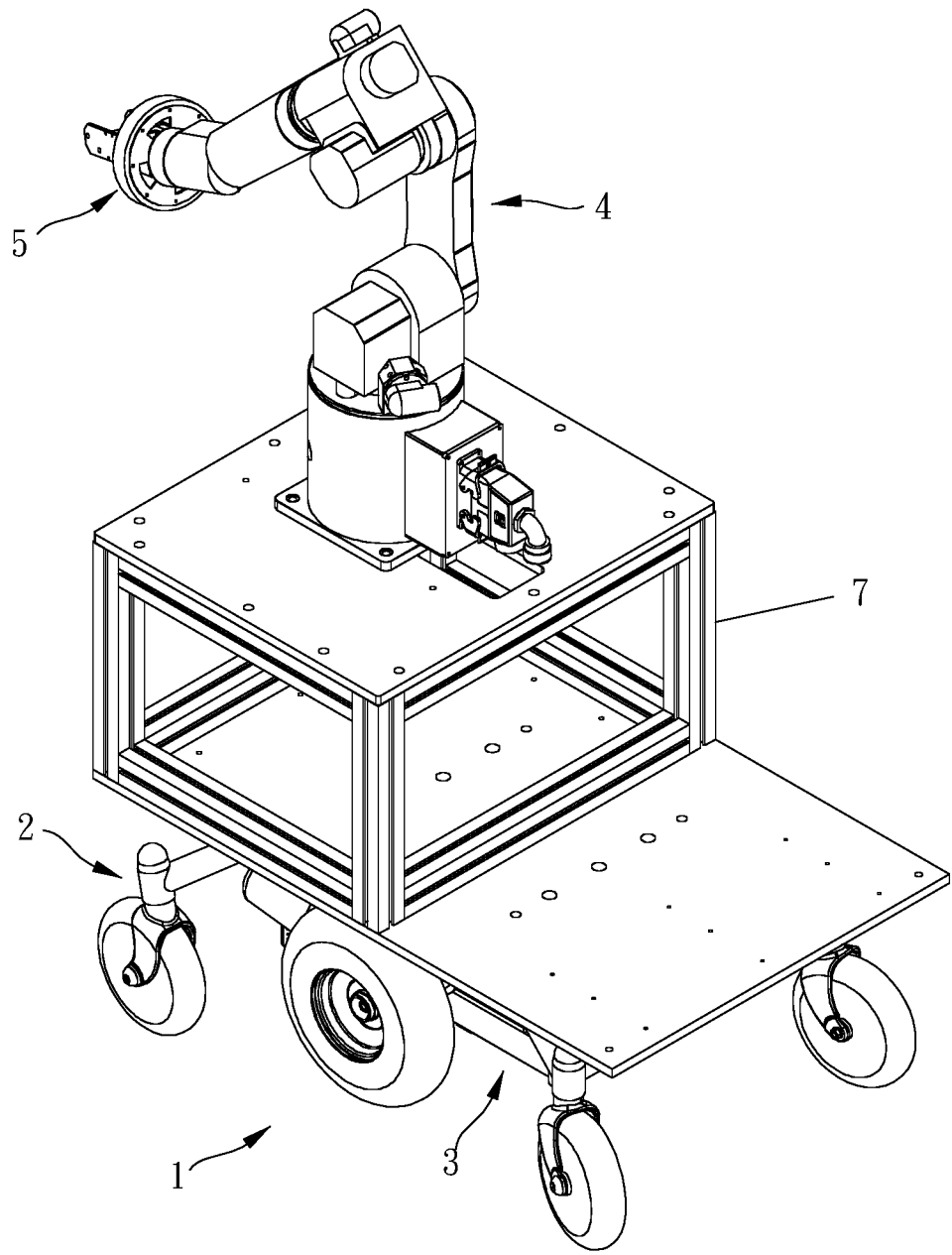
FIGS. 1-3 are stereograms viewed form different viewed angles according to a preferable embodiment of the present invention.
Figure 2:
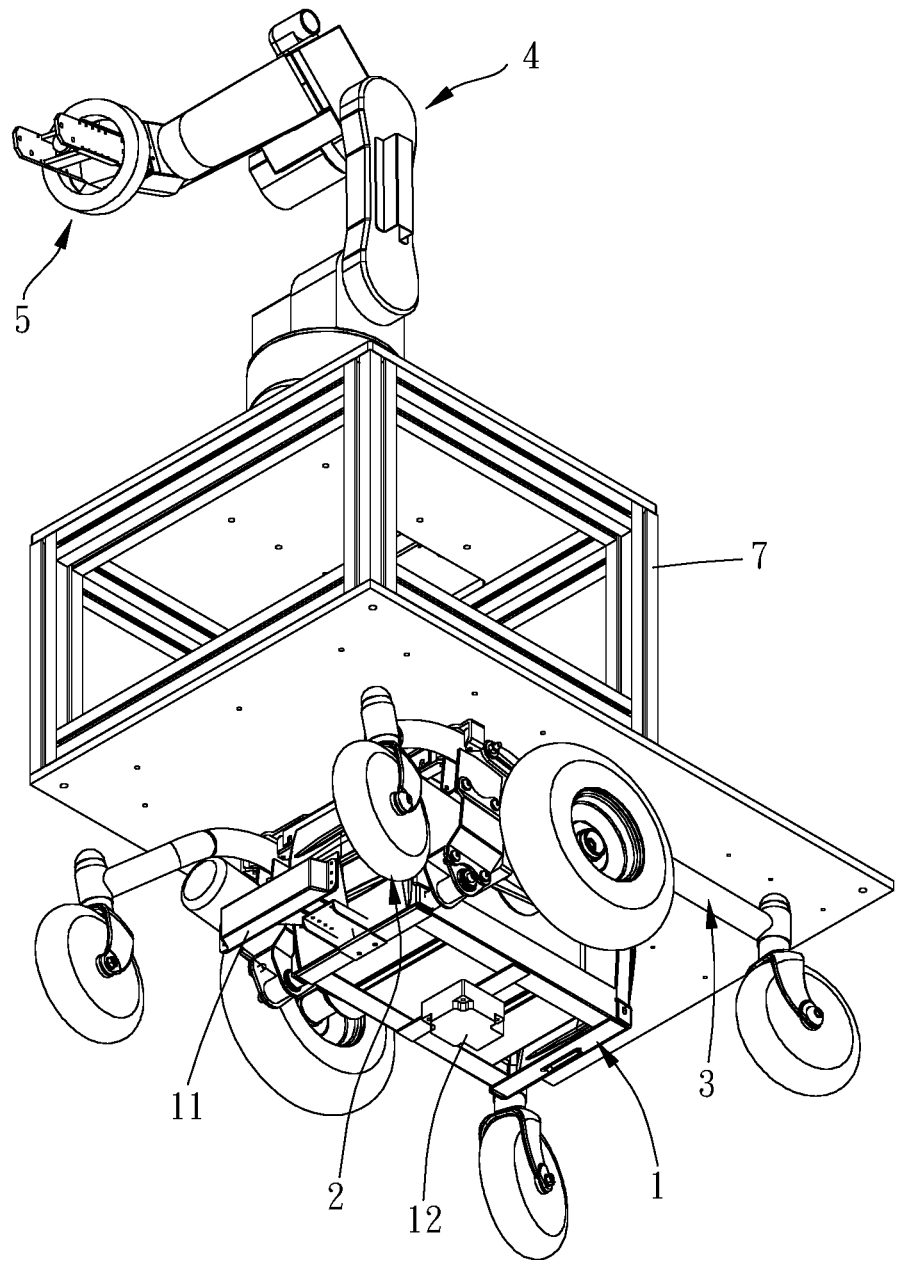
Figure 3:
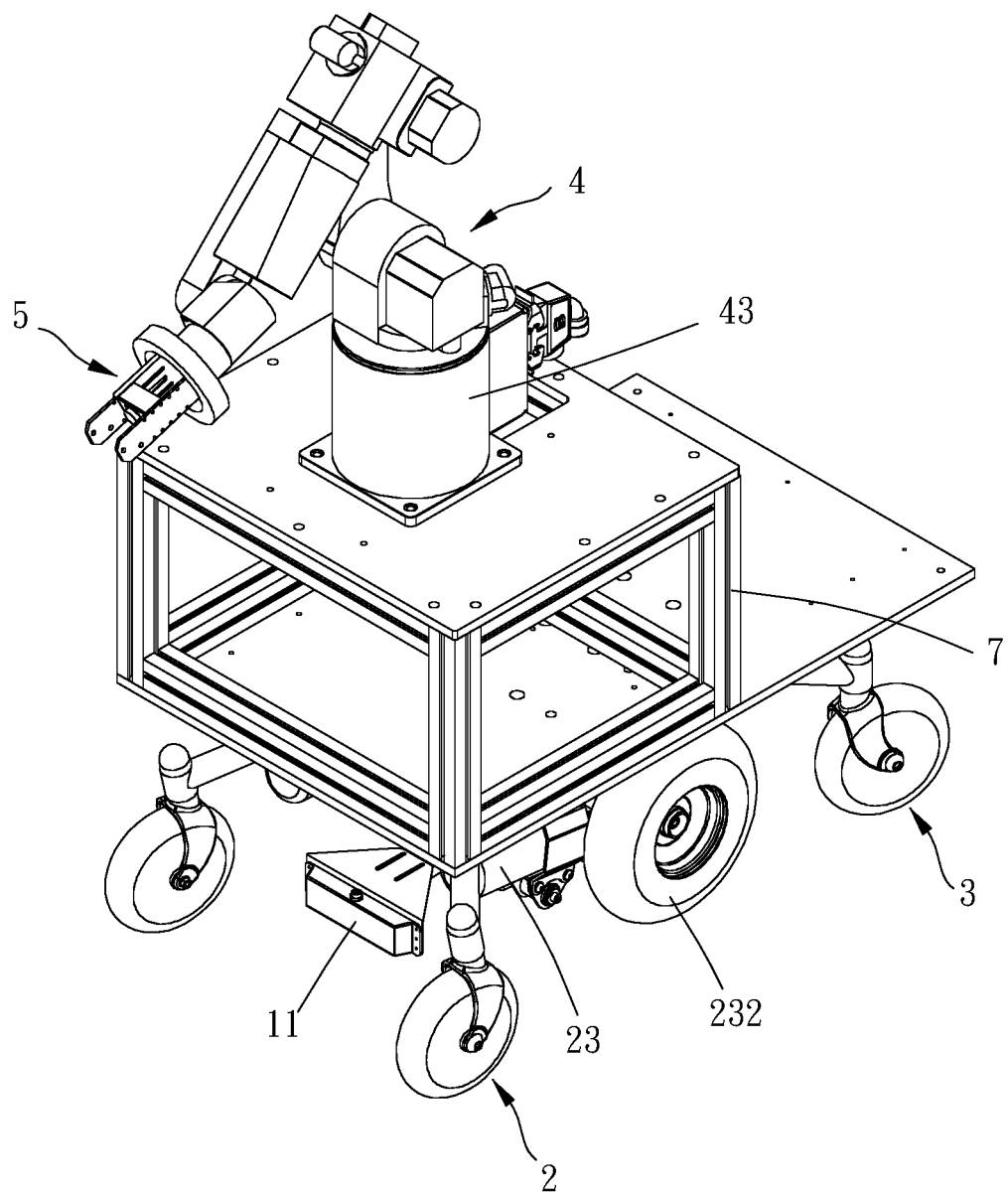
Figure 4:
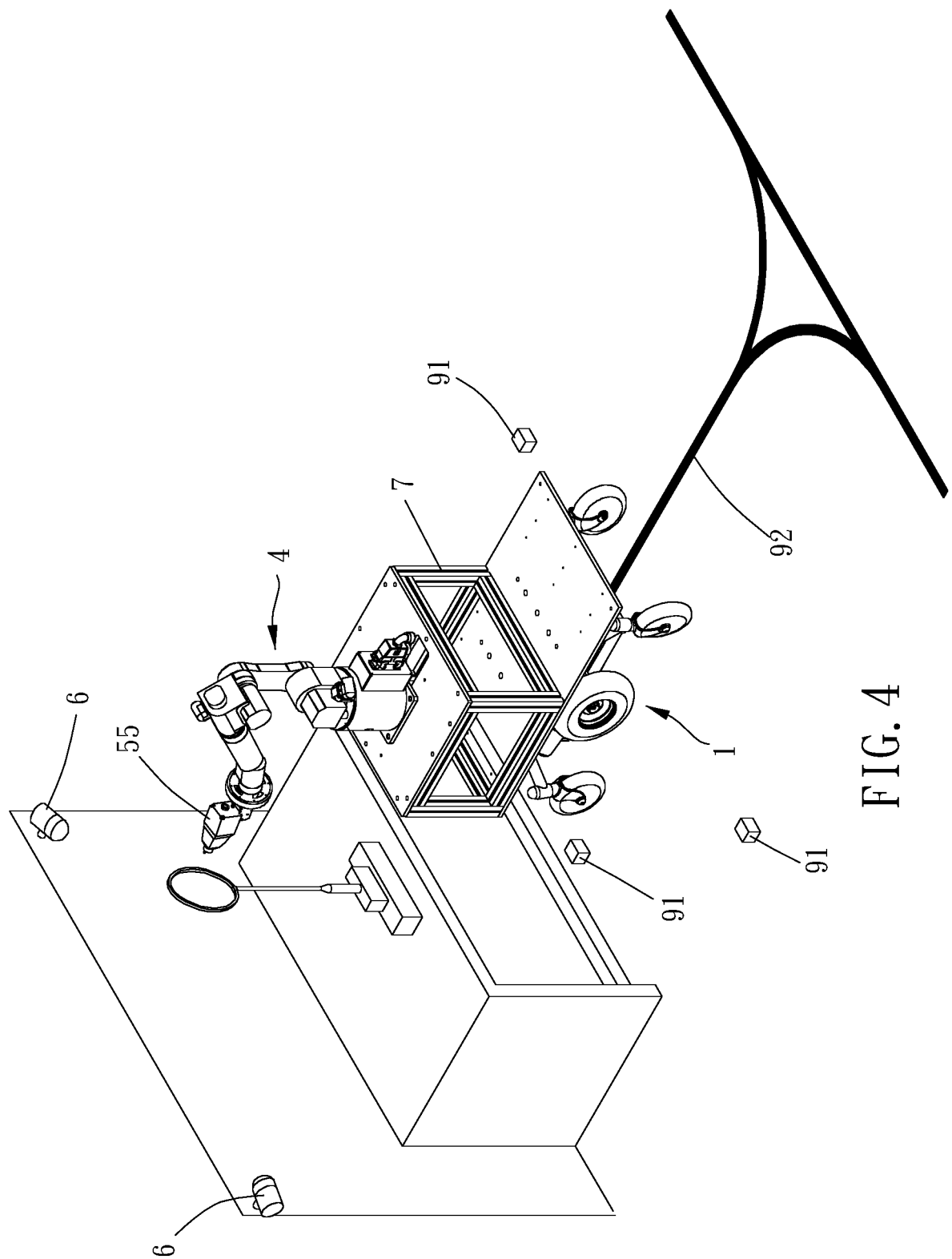
FIG. 4 is a drawing showing operation of a preferable embodiment of the present invention.
Figure 5:
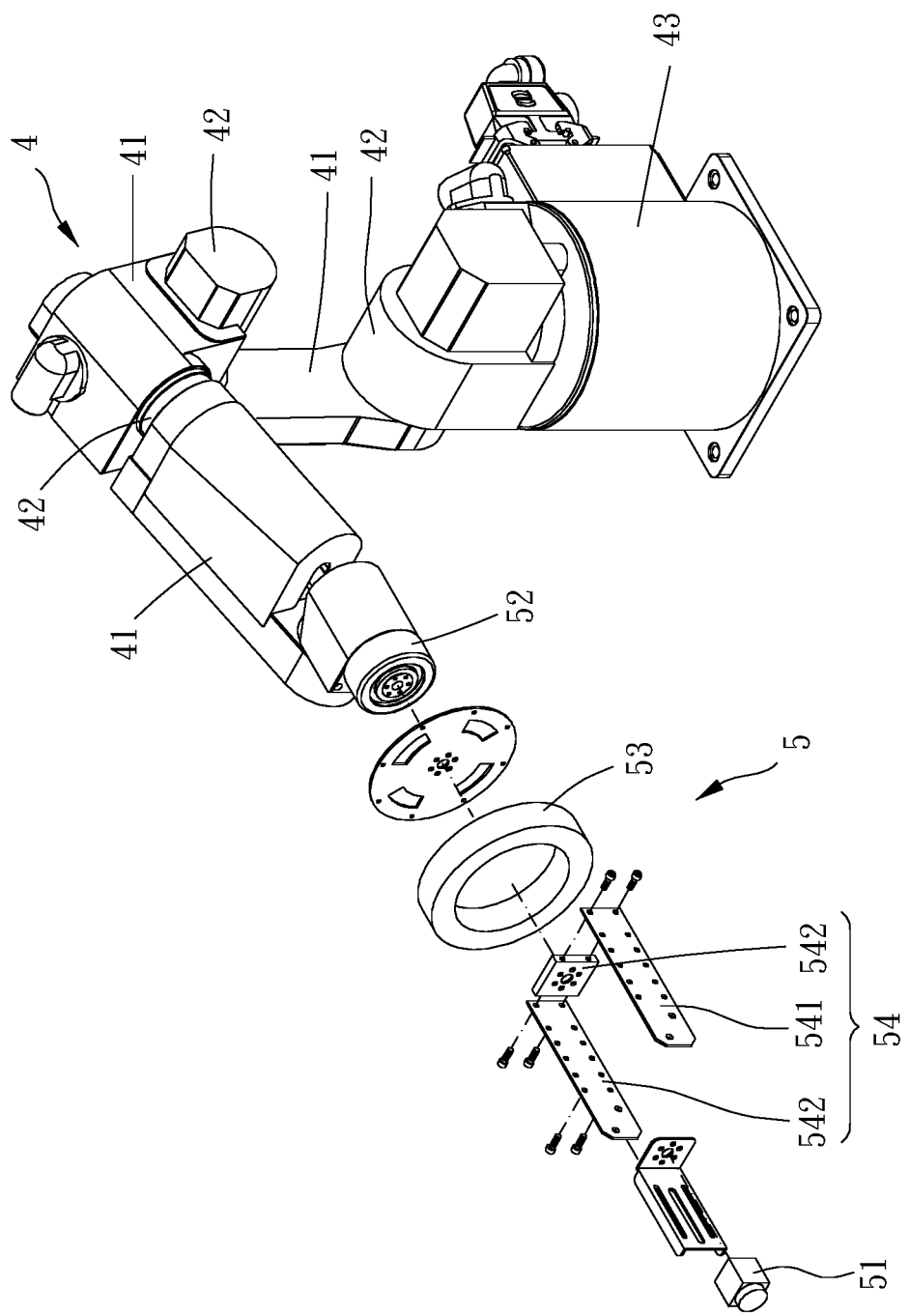
FIG. 5 is a partial breakdown drawing of a preferable embodiment of the present invention.
Figure 6:
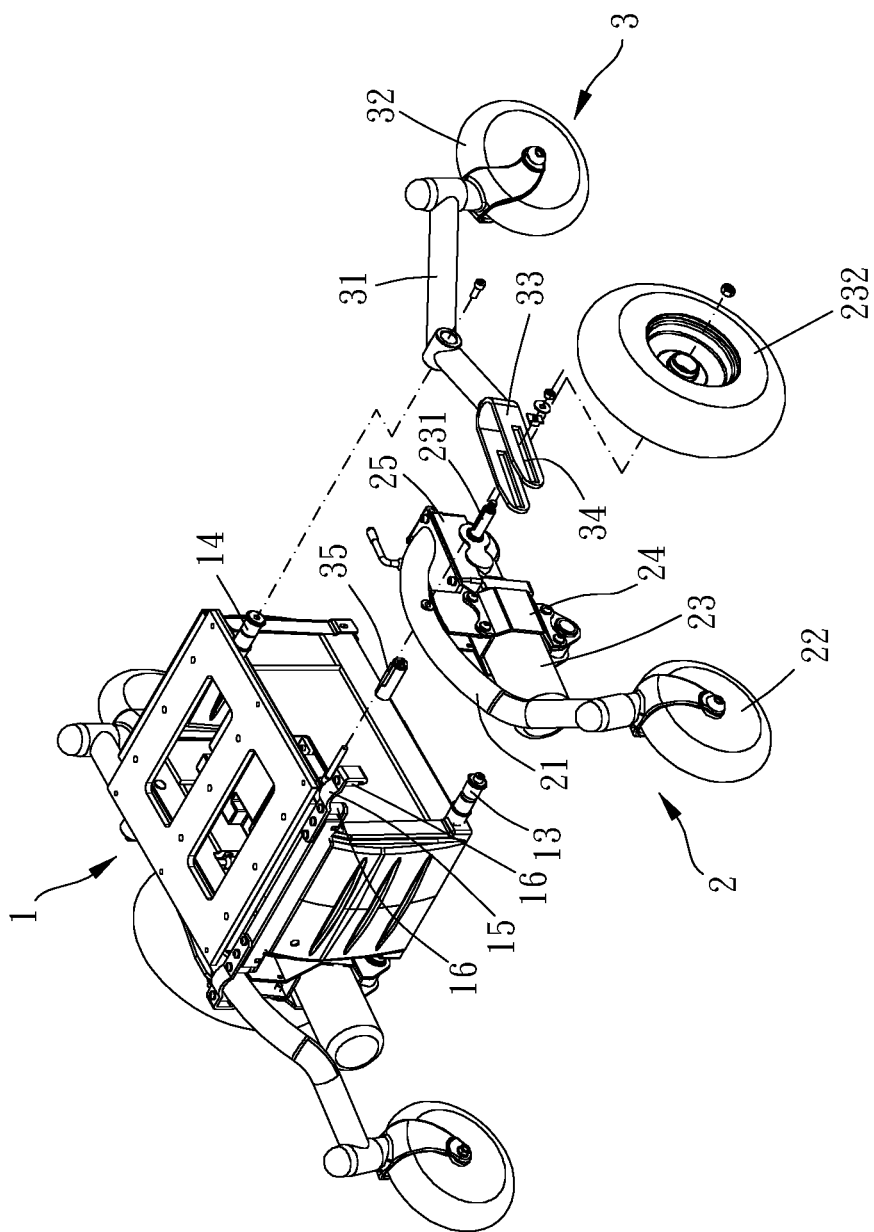
FIG. 6 is another partial breakdown drawing of a preferable embodiment of the present invention.
Figure 7:
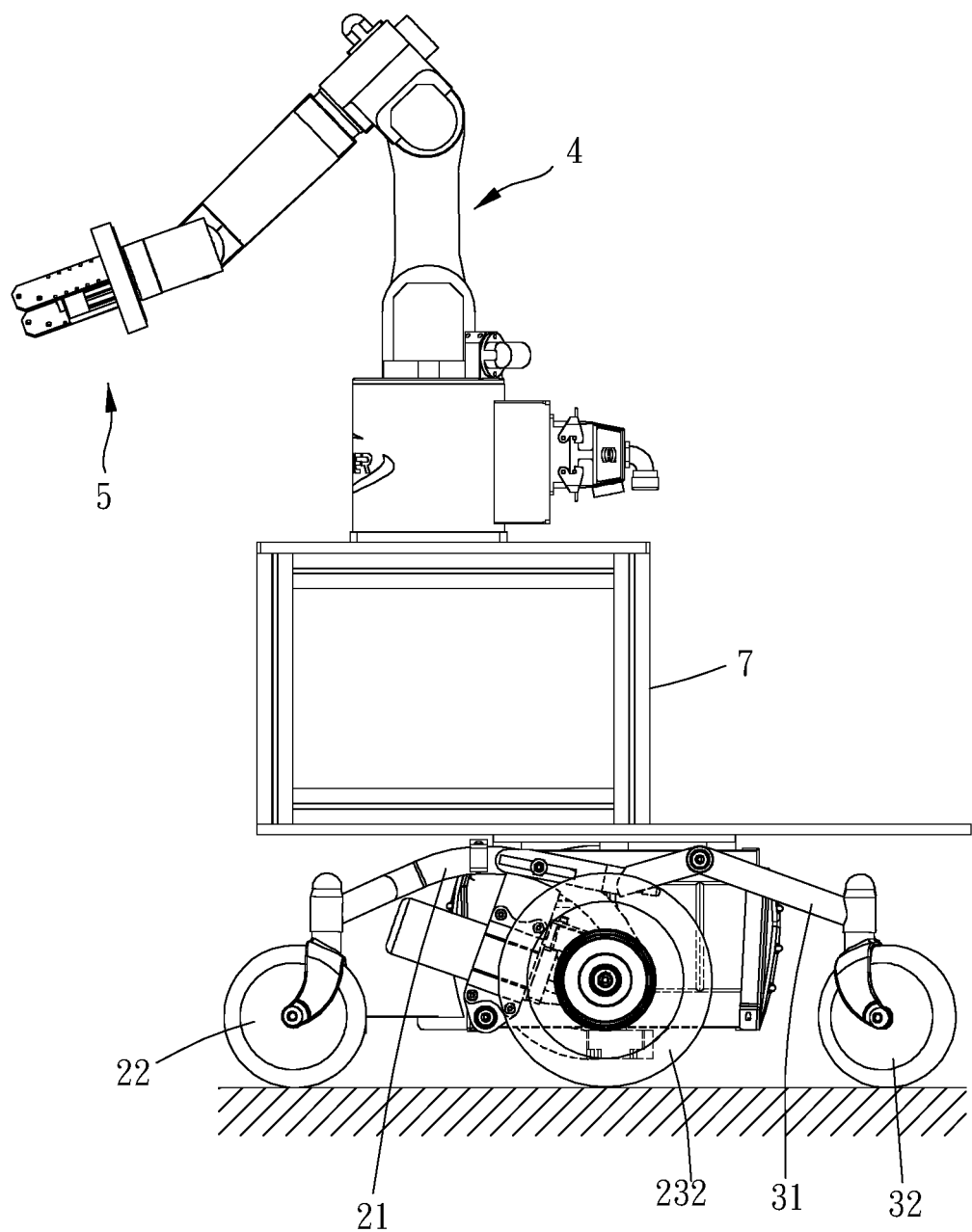
FIGS. 7-9 are side views of a preferable embodiment of the present invention.

Please refer to FIGS. 1 to 9 for a preferable embodiment of the present invention. A mobile vehicle having an AOI dynamic inspection system with multi-angle visual quality is configured to inspect an object in an environment, and includes a base body 1, two driving racks 2, two connecting rod assemblies 3, an arm member 4, a working portion 5 and at least two second photographing devices 6.

The two driving racks 2 is connected to the base body 1, and each of the two driving racks 2 includes a first rod member 21, a first wheel 22, a driving device 23 and a driving wheel 232. The first rod member 21 is connected to the base body 1, the driving wheel 232 is connected to a driving shaft 231 of the driving device 23, and the first wheel 22 is connected to an end of the first rod member 21 remote from the driving device 23. In this embodiment, each said driving device 23 is a motor, and the driving shaft 231 of the driving device 23 can drive the driving wheel 232 to rotate.

The two connecting rod assemblies 3 are connected to the base body 1, and each of the two connecting rod assemblies 3 includes a second rod member 31 and a second wheel 32. The second rod member 31 is connected to the base body 1, the second wheel 32 is connected to an end of the second rod member 31, and two side plates 33 are disposed to another end of connected to the second rod member 31. The two side plates 33 each includes an elongate slot 34, the first rod member 21 is disposed between the two side plates 33, and a fastener 35 is disposed through the elongate slots 34 of the two side plates 33 and the first rod member 21 so that the two side plates 33 are movable relative to the first rod member 21. In this embodiment, each of the two side plates 33 is elongated in a direction parallel to a direction in which the elongate slot 34 extends.

The arm member 4 is swingably connected to the base body 1.

The working portion 5 is disposed to an end of the arm member 4 remote from the base body, the working portion 5 includes a first photographing device 51, and the first photographing device 51 is configured for capturing an image of the object.

The at least two second photographing devices 6 are configured to be disposed in an environment and configured for capturing an image of the object.

The arm member 4 is driven to move according to the relative spatial relationship of the working portion 5 and the object obtained by automated optical inspection (AOI) according to the images of the object captured by the first photographing device 51 and the at least two second photographing devices 6. By comparison of a preset image and the images of the object captured by the first photographing device 51 and the at least two second photographing devices 6 with difference therebetween, the actual coordinate position of the object and the relative coordinate positions of the working portion 5 and the object can be obtained, and the size and quality of the object can be obtained. The arm member 4 is swingable to change the relative spatial relationship of the working portion 5 and the object so that a spraying device 55 disposed on the working portion 5 can proceed with spraying operation to the object. Whereby, it is quick and efficient to inspect, detect and measure the object, which is labor-saving.

Preferably, a Radio Frequency Identification (RFID) reader 11 is disposed on a bottom of the base body 1 and adjacent to the first wheels 22 of the two driving racks 2, and the RFID reader 11 is configured to sense at least one RFID tag 91 arranged in the environment so as to obtain a position of the base body 1 relative to the environment. A magnetism sensing device 12 is disposed on the bottom of the base body 1, and the magnetism sensing device 12 is configured to sense a magnetic stripe 92 arranged in the environment, for setting a predetermined route of the base body 1.

The arm member 4 includes a plurality of supporting arms 41 and a plurality of joints 42, and between neighboring two of the plurality of supporting arms 41 is one of the plurality of joints 42. The joint 42 can drive the supporting arm 41 to swing so that the arm member 4 can control the relative spatial relationship of the working portion 5 and the object. In this embodiment, a frame 7 is connected to the base body 1, the arm member 4 further includes a seat body 43, the seat body 43 is rotatably connected to the frame 7, and the seat body 43 is connected to one of the plurality of supporting arms 41 by one of the plurality of joints 42 so that the arm member 4 is rotatable relative to the base body 1 on a horizontal plane.

The working portion 5 includes a rotatable member 52, the rotatable member 52 is disposed on an end of the arm member 4 remote from the base body 1, the rotatable member 52 includes a light-emitting member 53 and a bracket 54, the bracket 54 includes a connection plate 541 and two side plates 542, the first photographing device 51 is disposed on the connection plate 541, and the spraying device 55 is connected to the two side plates 542. As a result, the inspection and spraying can be carried out at the same time. It is noted that a grip device may be disposed on the working portion for gripping and moving the object.

Specifically, each of two opposite sides of the base body 1 includes a first fixation portion 13, a second fixation portion 14 and a blocking member 15, the two driving racks 2 are rotatably connected to the first fixation portions 13 of the two opposite sides of the base body 1 respectively, and the second rod members 31 of the two connecting rod assemblies are connected to the second fixation portions 14 of the two opposite sides of the base body 1 respectively. The blocking member 15 curvedly extends over the first rod member 21, two abutting members 16 are disposed on a bottom side of the blocking member 15 on a horizontal plane, the two abutting members 16 are located at two sides of the first rod member 21, and the two abutting members 16 are cylindrical and extend vertically. The two abutting members 16 can restrict the first rod member 21 so as to prevent the first rod member 21 from swinging so that the base body 1 can move stably.

Figure 8:
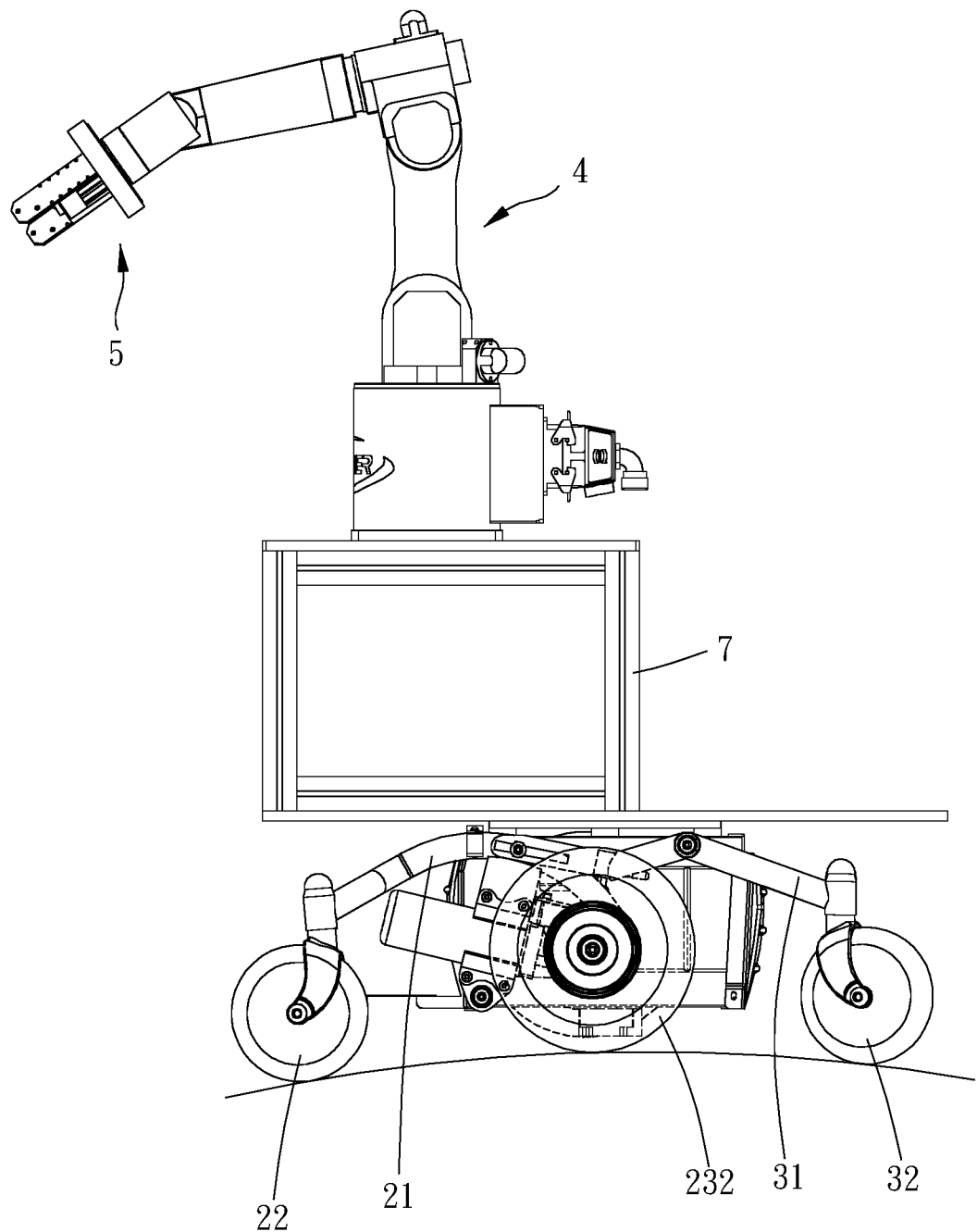
Figure 9:
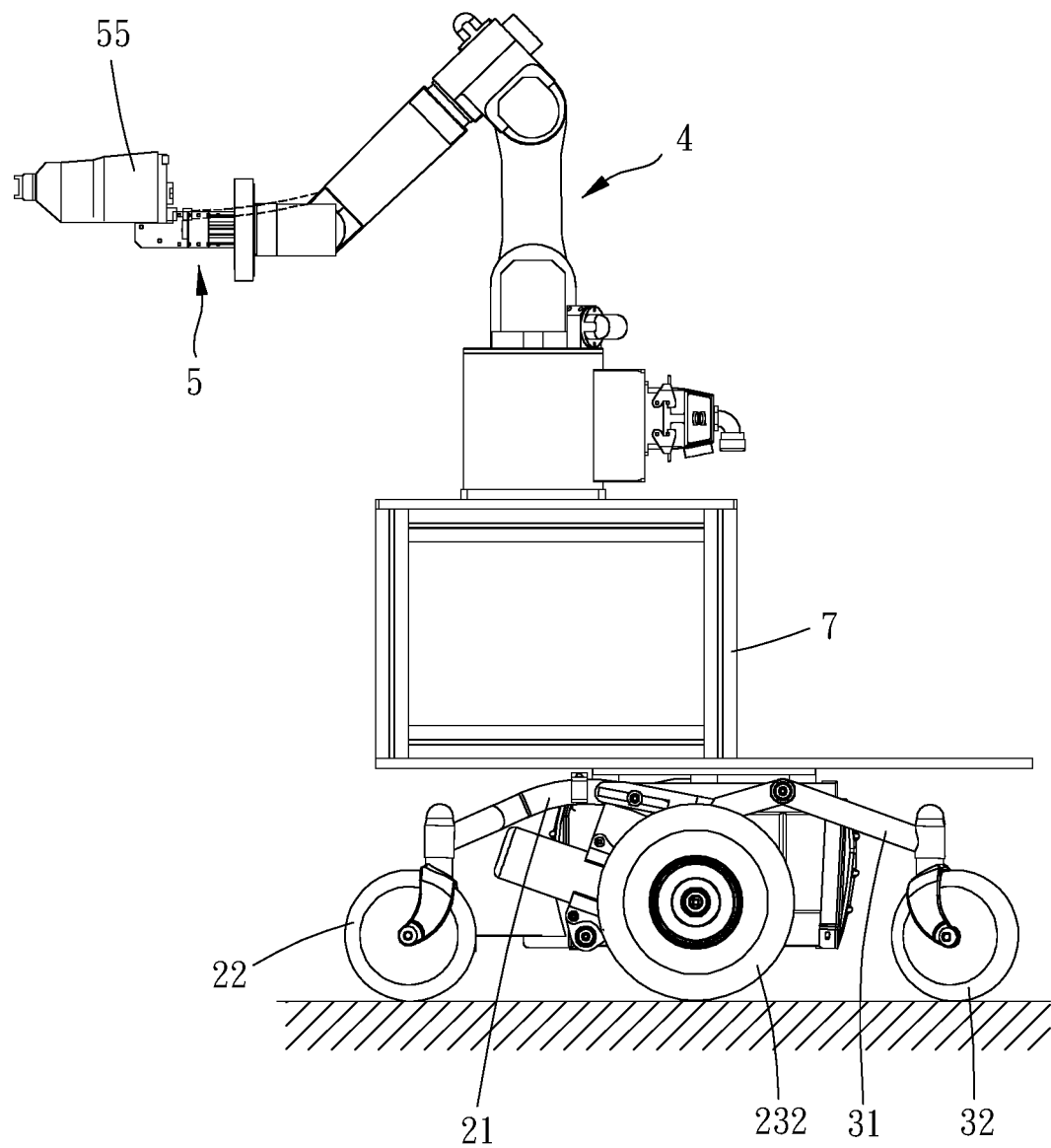

Specifically, each of the two driving racks 2 includes two assembling plate members 24 and a fixation frame 25, the two assembling plate members 24, the fixation frame 25 and the first rod member 21 are fixedly connected, and the driving device 23 is interposed between the two assembling plate members 24. The fixation frame 25 is disposed on an end of the first rod member 21 remote from the first wheel 22, the two assembling plate members 24 are located between the first wheel 22 and the fixation frame 25, the driving device 23 extends in a direction toward the fixation frame 25, and the driving shaft 231 projects from the fixation frame 25. Ends of the two assembling plate members 24 remote from the first rod member 21 is rotatably connected to the first fixation portion 13, and a portion of the second rod member 31 located between the second wheel 32 and the two side plates 33 is rotatably connected to the second fixation portion 14. Whereby, the first rod member 21 and the second rod member 31 are swingable relative to the base body 1 so that it can ensure the base body 1 moves stably on an non-flat surface in a manner that the first wheel 22, the driving wheel 232 and the second wheel 32 contact the non-flat surface (as shown in FIG. 8). In this embodiment, the first fixation portions 13 are disposed to an end of the base body 1 and adjacent to a bottom of the base body 1, the second fixation portions 14 are disposed to another end of the base body 1 and adjacent to a top of the base body 1, and the blocking members 15 are respectively located vertically above the first fixation portions 13. Each said driving wheel 232 is located between the first wheel 22 and the second wheel 32 arranged at the same side of the base body 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A mobile vehicle having an Automated Optical Inspection (MN) dynamic inspection system with multi-angle visual quality, including:
    a base body;
    two driving racks, connected to the base body, each of the two driving racks including a first rod member, a first wheel, a driving device and a driving wheel, the first rod member being connected to the base body, the driving wheel being connected to a driving shaft of the driving device, the first wheel being connected to an end of the first rod member remote from the driving device;
    two connecting rod assemblies, connected to the base body, each of the two connecting rod assemblies including a second rod member and a second wheel, the second rod member being connected to the base body, the second wheel being connected to an end of the second rod member, two side plates being disposed to another end of the second rod member, the two side plates each including an elongate slot, the first rod member being disposed between the two side plates, a fastener being disposed through the elongate slots of the two side plates and the first rod member so that the two side plates are movable relative to the first rod member;
    an arm member, swingably connected to the base body;
    a working portion, disposed to an end of the arm member remote from the base body, including a first photographing device, the first photographing device being configured for capturing an image of an object;

at least two second photographing devices, configured to be disposed in an environment and configured for capturing an image of the object;

wherein the arm member is driven to move according to the relative spatial relationship of the working portion and the object obtained by automated optical inspection (AOI) according to the images of the object captured by the first photographing device and the at least two second photographing devices.

2. The mobile vehicle of claim 1, wherein a Radio Frequency Identification (RFID) reader is disposed on a bottom of the base body and adjacent to the first wheels of the two driving racks, and the RFID reader is configured to sense at least one RFID tag arranged in the environment so as to obtain a position of the base body relative to the environment.

3. The mobile vehicle of claim 1, wherein a magnetism sensing device is disposed on a bottom of the base body bottom, and the magnetism sensing device is configured to sense a magnetic stripe arranged in the environment.

4. The mobile vehicle of claim 1, wherein the arm member includes a plurality of supporting arms and a plurality of joints, and between neighboring two of the plurality of supporting arms is one of the plurality of joints.

5. The mobile vehicle of claim 4, further includes a frame, wherein the frame is connected to the base body, the arm member further includes a seat body, the seat body is rotatably connected to the frame, and the seat body is connected to one of the plurality of supporting arms by one of the plurality of joint.

6. The mobile vehicle of claim 1, wherein the working portion includes a rotatable member, the rotatable member is disposed on an end of the arm member remote from the base body, the rotatable member includes a light-emitting member and a bracket, the bracket includes a connection plate and two side plates, and the first photographing device is disposed on the connection plate.

7. The mobile vehicle of claim 6, wherein a spraying device is disposed on the two side plates.

8. The mobile vehicle of claim 1, wherein each of two opposite sides of the base body includes a first fixation portion, a second fixation portion and a blocking member, the two driving racks are rotatably connected to the first fixation portions of the two opposite sides of the base body respectively, the second rod members of the two connecting rod assemblies are connected to the second fixation portions of the two opposite sides of the base body respectively, the blocking member curvedly extends over the first rod member, two abutting members are disposed on a bottom sides of the blocking member on a horizontal plane, the two abutting members are located at two sides of the first rod member, and the two abutting members are cylindrical and extend vertically.

9. The mobile vehicle of claim 8, wherein each of the two driving racks includes two assembling plate members and a fixation frame, the two assembling plate members, the fixation frame and the first rod member are fixedly connected, and the driving device is interposed between the two assembling plate members.

10. The mobile vehicle of claim 9, wherein the fixation frame is disposed on an end of the first rod member remote from the first wheel, the two assembling plate members are located between the first wheel and the fixation frame, the driving device extends in a direction toward the fixation frame, and the driving shaft projects from the fixation frame.

11. The mobile vehicle of claim 8, wherein ends of the two assembling plate members remote from the first rod member are rotatably connected to the first fixation portion, and a portion of the second rod member located between the second wheel and the two side plates are rotatably connected to the second fixation portion.

12. The mobile vehicle of claim 8, wherein the first fixation portions of the two opposite sides of the base body are disposed to an end of the base body and adjacent to a bottom of the base body, and the second fixation portions of the two opposite sides of the base body are disposed to another end of the base body and adjacent to a top of the base body.

13. The mobile vehicle of claim 12, wherein the blocking members of the two opposite sides of the base body are respectively located vertically above the first fixation portions of the two opposite sides of the base body.

14. The mobile vehicle of claim 8, wherein each said driving wheel is located between the first wheel and the second wheel arranged at the same side of the base body.

15. The mobile vehicle of claim 8, wherein each of the two side plates is elongated in a direction parallel to a direction in which the elongate slot extends.

\* \* \* \* \*